(12) United States Patent
Szilagyi et al.

(10) Patent No.: US 11,930,547 B2
(45) Date of Patent: Mar. 12, 2024

(54) MPTCP FRIENDLY CELLULAR MULTI-CONNECTIVITY ARCHITECTURE WITH TRANSPARENT PROXY

(71) Applicant: Nokia Technologies Oy, Espoo (FI)

(72) Inventors: Peter Szilagyi, Budapest (HU); Devaki Chandramouli, Plano, TX (US)

(73) Assignee: Nokia Technologies OY, Espoo (FI)

( * ) Notice: Subject to any disclaimer, the term of this patent is extended or adjusted under 35 U.S.C. 154(b) by 6 days.

(21) Appl. No.: 17/283,045

(22) PCT Filed: Oct. 9, 2018

(86) PCT No.: PCT/US2018/054933
§ 371 (c)(1),
(2) Date: Apr. 6, 2021

(87) PCT Pub. No.: WO2020/076296
PCT Pub. Date: Apr. 16, 2020

(65) Prior Publication Data
US 2021/0352749 A1    Nov. 11, 2021

(51) Int. Cl.
*H04W 76/15*    (2018.01)
*H04W 28/02*    (2009.01)
*H04W 60/00*    (2009.01)
*H04W 80/06*    (2009.01)

(52) U.S. Cl.
CPC ....... *H04W 76/15* (2018.02); *H04W 28/0263* (2013.01); *H04W 60/005* (2013.01); *H04W 80/06* (2013.01)

(58) Field of Classification Search
CPC ............. H04W 76/15; H04W 28/0263; H04W 60/005; H04W 80/06; H04L 47/2433; H04L 69/14; H04L 47/193; H04L 45/24; H04L 47/41; H04L 47/24
See application file for complete search history.

(56) References Cited

U.S. PATENT DOCUMENTS

2018/0062979 A1    3/2018    Zee et al.

OTHER PUBLICATIONS

3GPP TR 23.793 V1.0.0 (Sep. 2018), Study on Access Traffic Steering, Switching and Splitting support in the 5G system architecture. (Year: 2018).*
Ford, A., et al., "Architectural Guidelines for Multipath TCP Development", IETF RFC 6182, Mar. 2011, 28 pgs.
(Continued)

*Primary Examiner* — Mandish K Randhawa
(74) *Attorney, Agent, or Firm* — Barta Jones, PLLC

(57) ABSTRACT

A method includes connecting, by a terminal device, in a protocol data unit session establishment procedure, to at least one master node and at least one network node that provides a proxy for at least one connection of the terminal device, and establishing a master multipath transmission control protocol sub-flow. The method includes receiving, at a multipath transmission control layer, a notification that includes at least one multipath transmission control segment with an add address option that advertises an internet protocol interface address of at least one of the proxy and the at least one network node, and establishing a secondary multipath transmission control protocol sub-flow to the internet protocol interface address in response to receiving the notification.

10 Claims, 8 Drawing Sheets

700

710: Standard PDU session establishment procedure in which UE connects to the MN and the UPF that provides Proxy function as well 720: Standard MPTCP connection establishment to set up master MPTCP sub-flow performed via TCP handshake procedure, where the UE addresses packets to the server's IP (dest)

730: UE participates in "SN Addition procedure", MN, SN, UPF and involved SMF/AMF configure MN/SN bearers and U-plane routing 740: UE's MPTCP layer receives notification from UPF/Proxy with an MPTCP segment with an ADD_ADDRESS option to advertise an IP (itf) of UPF/Proxy 750: UE establishes a secondary MPTCP sub-flow to the advertised IP (itf) address as a response to receiving the ADD_ADDRESS option

(56) References Cited

OTHER PUBLICATIONS

Ford, A., et al., "TCP Extensions for Multipath Operation with Multiple Addresses", IETF RFC 6824, Jan. 2013, 64 pgs.
3GPP TR 23.793, V1.0.0 (Sep. 2018), : "$3^{rd}$ Generation Partnership Project; Technical specification Group Services and System Aspects; Study on Access Traffic Steering, Switching and Splitting support in the 5G system architecture (Release 16)", Sections 6.2.2-6.2.7; Section 6.5, 21 pgs.

* cited by examiner

700 

710: Standard PDU session establishment procedure in which UE connects to the MN and the UPF that provides Proxy function as well 720: Standard MPTCP connection establishment to set up master MPTCP sub-flow performed via TCP handshake procedure, where the UE addresses packets to the server's IP (dest)

730: UE participates in "SN Addition procedure", MN, SN, UPF and involved SMF/AMF configure MN/SN bearers and U-plane routing 740: UE's MPTCP layer receives notification from UPF/Proxy with an MPTCP segment with an ADD_ADDRESS option to advertise an IP (itf) of UPF/Proxy 750: UE establishes a secondary MPTCP sub-flow to the advertised IP (itf) address as a response to receiving the ADD_ADDRESS option

810: UPF (that provides Proxy function) connects to MN and UE in a Standard PDU session establishment procedure 820: MPTCP proxy establishes an MPTCP or TCP connection to the content server and standard MPTCP connection establishment sets up master MPTCP sub-flow via TCP handshake procedure 830: UPF/Proxy function detects the MPTCP connection and notifies SMF. SMF can determine MPTCP connection activation also from UE capability. SMF triggers MN to start a standard "SN addition procedure"

840: During the "SN Addition procedure", UPF as well as MN, SN and the involved SMF/AMF configure MN/SN bearers and the U-plane routing so that MN uses an MCG bearer, SN uses an SCG bearer and both are routed to the UPF/Proxy at the N3 interface 850: In response to UE establishing a secondary MPTCP sub-flow to the advertised IP (itf) address as a response to receiving the ADD_ADDRESS option, Proxy handles IP (itf) address transparently, multiplexing the secondary sub-flow into the same MPTCP socket and merging the traffic to the same (MP)TCP connection towards the server.

Fig. 8

MPTCP FRIENDLY CELLULAR MULTI-CONNECTIVITY ARCHITECTURE WITH TRANSPARENT PROXY

CROSS REFERENCE TO RELATED APPLICATION

This patent application is a U.S. National Stage application of International Patent Application Number PCT/US2018/054933 filed Oct. 9, 2018, which is hereby incorporated by reference in its entirety.

TECHNICAL FIELD

The teachings in accordance with the exemplary embodiments of this invention relate generally to multi-connectivity technology developed in IETF and specifically to Multipath TCP (MPTCP).

BACKGROUND

MPTCP extends the capabilities of traditional TCP so that it provides connectivity between two endpoints over multiple paths. For example, MPTCP data segments may traverse multiple fully or partially disjoint paths in an end-to-end transmission. MPTCP establishes separate sub-flows over the different paths; each sub-flow resembles a traditional TCP connection with additional TCP option headers to accommodate MPTCP signalling. The protocol specification and operation of MPTCP are standardized by IETF in RFC 6182 and RFC 6824. MPTCP is relevant to 3GPP systems including 5G as there are multiple overlapping capabilities (for example, the establishment and management of multiple paths, packet re-ordering and scheduling), harmonization opportunities (for example, simplify 3GPP RAN complexity by relying on existing and proven MPTCP enablers for certain parts of multi-connectivity) and optimization opportunities (for example, seamless interworking, traffic steering/switching/splitting).

E-UTRA and NR multi-connectivity is specified in 3GPP TS 37.340. A U-plane radio protocol architecture for MR-DC with 5GC may be analysed from the UE side. From the UE's perspective, three types of bearers may exist: MCG bearer, SCG bearer and split bearer.

Certain abbreviations that may be found in the description and/or in the Figures are herewith defined as follows:
ACK Acknowledgement
AMF Access and Mobility Function
ANDSF Access Network Discovery and Selection Function
DL Downlink
DRB Data Radio Bearer
DSS Digital Sequence Signal
EPC Evolved Packet Core
E-UTRA Evolved Universal Mobile Telecommunications System (UMTS) Terrestrial Radio Access
gNB 5G Enhanced Node B (Base station)
ARQ Hybrid Automatic Repeat Request
HO Handover
HTTP Hypertext Transfer Protocol
HTTPS HTTP Secure
ID Identity
IETF Internet Engineering Task Force
IMSI International Mobile Subscriber Identity
IP Internet protocol
IS Intermediate System
LTE long term evolution
MAC Medium access control
MCG Master Cell Group
MME mobility management entity
MN Master Node
MPTCP Multipath TCP
MR-DC Multi-RAT Dual Connectivity
Msg Message
NAS Non Access Stratum
NCE network control element
NR New radio
N/W Network
PDU Protocol data unit
PGW Packet Data Network Gateway
PNF Physical Network Function
QFI QoS Flow Identity
QoE Quality of Experience
QoS Quality of Service
RAN Radio Access Network
RAT Radio Access Technology
RF Radio Frequency
RFC Request for Comments
RLC Radio Link Control
SCG Secondary Cell Group
SDAP Service Data Adaptation Protocol
SLA Service Level Agreement
SMF Session Management Function
SN Secondary Node
TCP Transmission Control Protocol
TFT Traffic Flow Template
UE User Equipment
UL Uplink
UPF User Plane Function
VNF Virtual Network Function
5G Fifth generation mobile communication system
5GC 5G Core

SUMMARY

This section contains examples of possible implementations and is not meant to be limiting:

In accordance with one aspect, an example method comprises connecting, by a terminal device, in a protocol data unit session establishment procedure, to at least one master node and at least one network node that provides a transparent proxy for at least one connection of the terminal device, and establishing a master multipath transmission control protocol sub-flow. The method includes receiving, at a multipath transmission control layer, a notification that includes at least one multipath transmission control segment with an add address option that advertises an internet protocol interface address of at least one of the proxy and the at least one network node, and establishing a secondary multipath transmission control protocol sub-flow to the internet protocol interface address in response to receiving the notification.

In accordance with the example embodiments as described in the paragraphs above, receiving, during a secondary node addition procedure, a requirement to map at least one sub flow according to at least one quality of service flow.

In accordance with the example embodiments as described in the paragraphs above, establishing the master multipath transmission control protocol sub-flow via a transmission control protocol handshake procedure during a multipath transmission control protocol connection establishment procedure, wherein the terminal device addresses at least one packet to a server internet protocol destination address associated with a server.

In accordance with the example embodiments as described in the paragraphs above, wherein terminal device has a single cellular internet protocol address.

In accordance with the example embodiments as described in the paragraphs above, mapping multipath transmission control protocol sub-flows to quality of service flows; and mapping quality of service flows to at least one of at least one master cell group bearer and at least one secondary cell group bearer.

In accordance with the example embodiments as described in the paragraphs above, wherein the at least one network node is at least one user plane function and the proxy is part of the at least one user plane function.

In accordance with the example embodiments as described in the paragraphs above, establishing at least one additional sub-flow over at least one non-cellular access in a same multipath transmission control protocol connection.

In accordance with one aspect, an example method comprises connecting, by at least one network node that provides a proxy for at least one connection of a terminal device, to the terminal device, and at least one master node in a protocol data unit session establishment procedure; intercepting a transmission control protocol handshake procedure from the terminal device and terminating at least one multipath transmission control protocol sub-flow towards the terminal device; sending at least one notification to trigger a secondary node addition procedure for the terminal device; configuring, during the secondary node addition procedure, at least one main node bearer and at least one secondary node bearer and U-plane routing so that the at least one master node and the secondary node are routed to at least one of the proxy and the at least one network node; sending, to a multipath transmission control layer of the terminal device, notification that includes at least one multipath transmission control segment with an add address option that advertises an internet protocol interface address of at least one of the proxy and the at least one user plane function; and performing, in response to sending the notification, multipath transmission control protocol connection termination for the terminal device.

In accordance with another aspect, an example apparatus comprises means for connecting, by a terminal device, in a protocol data unit session establishment procedure, to at least one master node and at least one network node that provides a transparent proxy for at least one connection of the terminal device; means for establishing a master multipath transmission control protocol sub-flow; means for receiving, at a multipath transmission control layer, a notification that includes at least one multipath transmission control segment with an add address option that advertises an Internet protocol interface address of at least one of the proxy and the at least one network node; and means for establishing a secondary multipath transmission control protocol sub-flow to the internet protocol interface address in response to receiving the notification.

In accordance with another aspect, an example apparatus comprises at least one processor; and at least one non-transitory memory including computer program code, the at least one memory and the computer program code may be configured to, with the at least one processor, cause the apparatus to: connect, by a terminal device, in a protocol data unit session establishment procedure, to at least one master node and at least one network node that provides a transparent proxy for at least one connection of the terminal device; establish a master multipath transmission control protocol sub-flow; receive, at a multipath transmission control layer, a notification that includes at least one multipath transmission control segment with an add address option that advertises an internet protocol interface address of at least one of the proxy and the at least one network node; and establish a secondary multipath transmission control protocol sub-flow to the Internet protocol interface address in response to receiving the notification.

In accordance with the example embodiments as described in the paragraphs above, receive, during a secondary node addition procedure, a requirement to map at least one sub flow according to at least one quality of service flow.

In accordance with the example embodiments as described in the paragraphs above, establish the master multipath transmission control protocol sub-flow via a transmission control protocol handshake procedure during a multipath transmission control protocol connection establishment procedure, wherein the terminal device addresses at least one packet to a server internet protocol destination address associated with a server.

In accordance with the example embodiments as described in the paragraphs above, wherein terminal device has a single cellular internet protocol address.

In accordance with the example embodiments as described in the paragraphs above, map multipath transmission control protocol sub-flows to quality of service flows; and mapping quality of service flows to at least one of at least one master cell group bearer and at least one secondary cell group bearer.

In accordance with the example embodiments as described in the paragraphs above, wherein the at least one network node is at least one user plane function and the proxy is part of the at least one user plane function.

In accordance with the example embodiments as described in the paragraphs above, establish at least one additional sub-flow over at least one non-cellular access in a same multipath transmission control protocol connection.

In accordance with another aspect, an example apparatus comprises means for connecting, by at least one network node that provides a proxy for at least one connection of a terminal device, to the terminal device, and at least one master node in a protocol data unit session establishment procedure; means for intercepting a transmission control protocol handshake procedure from the terminal device and terminating at least one multipath transmission control protocol sub-flow towards the terminal device; means for sending at least one notification to trigger a secondary node addition procedure for the terminal device; means for configuring, during the secondary node addition procedure, at least one main node bearer and at least one secondary node bearer and U-plane routing so that the at least one master node and the secondary node are routed to at least one of the proxy and the at least one network node; means for sending, to a multipath transmission control layer of the terminal device, notification that includes at least one multipath transmission control segment with an add address option that advertises an internet protocol interface address of at least one of the proxy and the at least one user plane function; and means for performing, in response to sending the notification, multipath transmission control protocol connection termination for the terminal device.

In accordance with another aspect, an example apparatus comprises at least one processor; and at least one non-transitory memory including computer program code, the at least one memory and the computer program code may be configured to, with the at least one processor, cause the apparatus to connect, by at least one network node that provides a proxy for at least one connection of a terminal device, to the terminal device, and at least one master node in a protocol data unit session establishment procedure; intercepting a transmission control protocol handshake procedure from the terminal device and terminating at least one multipath transmission control protocol sub-flow towards the terminal device; sending at least one notification to trigger a secondary node addition procedure for the terminal device; configuring, during the secondary node addition procedure, at least one main node bearer and at least one secondary node bearer and U-plane routing so that the at least one master node and the secondary node are routed to at least one of the proxy and the at least one network node; sending, to a multipath transmission control layer of the terminal device, notification that includes at least one multipath transmission control segment with an add address option that advertises an internet protocol interface address of at least one of the proxy and the at least one user plane function; and performing, in response to sending the notification, multipath transmission control protocol connection termination for the terminal device.

In accordance with the example embodiments as described in the paragraphs above, detect at least one multipath transmission control protocol connection and providing a notification to at least one session management function, wherein the at least one session management function, wherein the notification is configured to be used by the at least one session management function to start a secondary node addition procedure.

In accordance with the example embodiments as described in the paragraphs above, wherein the proxy comprises a transparent multipath transmission control protocol proxy with multi-homing emulation for multiple addresses a multipath transmission control protocol proxy side to trigger multipath transmission control protocol sub-flow creation at the terminal device.

In accordance with the example embodiments as described in the paragraphs above, wherein a transparent property makes a mechanism independent of the terminal device and at least one upper layer protocol.

In accordance with the example embodiments as described in the paragraphs above, wherein terminal device has a single cellular internet protocol address.

In accordance with the example embodiments as described in the paragraphs above, perform multipath transmission control protocol termination that includes re-ordering and multiplexing.

In accordance with the example embodiments as described in the paragraphs above, wherein the terminal device addresses at least one packet to a server internet protocol destination address associated with a server.

BRIEF DESCRIPTION OF THE DRAWINGS

The foregoing and other aspects of embodiments of this invention are made more evident in the following Detailed Description, when read in conjunction with the attached Drawing Figures, wherein:

FIG. 7 shows a method in accordance with example embodiments which may be performed by an apparatus; and FIG. 8 shows another method in accordance with example embodiments which may be performed by an apparatus.

DETAILED DESCRIPTION

In the example embodiments as described herein a method and apparatus that provides a base station configured hybrid random access procedure is disclosed.

Figure 1:
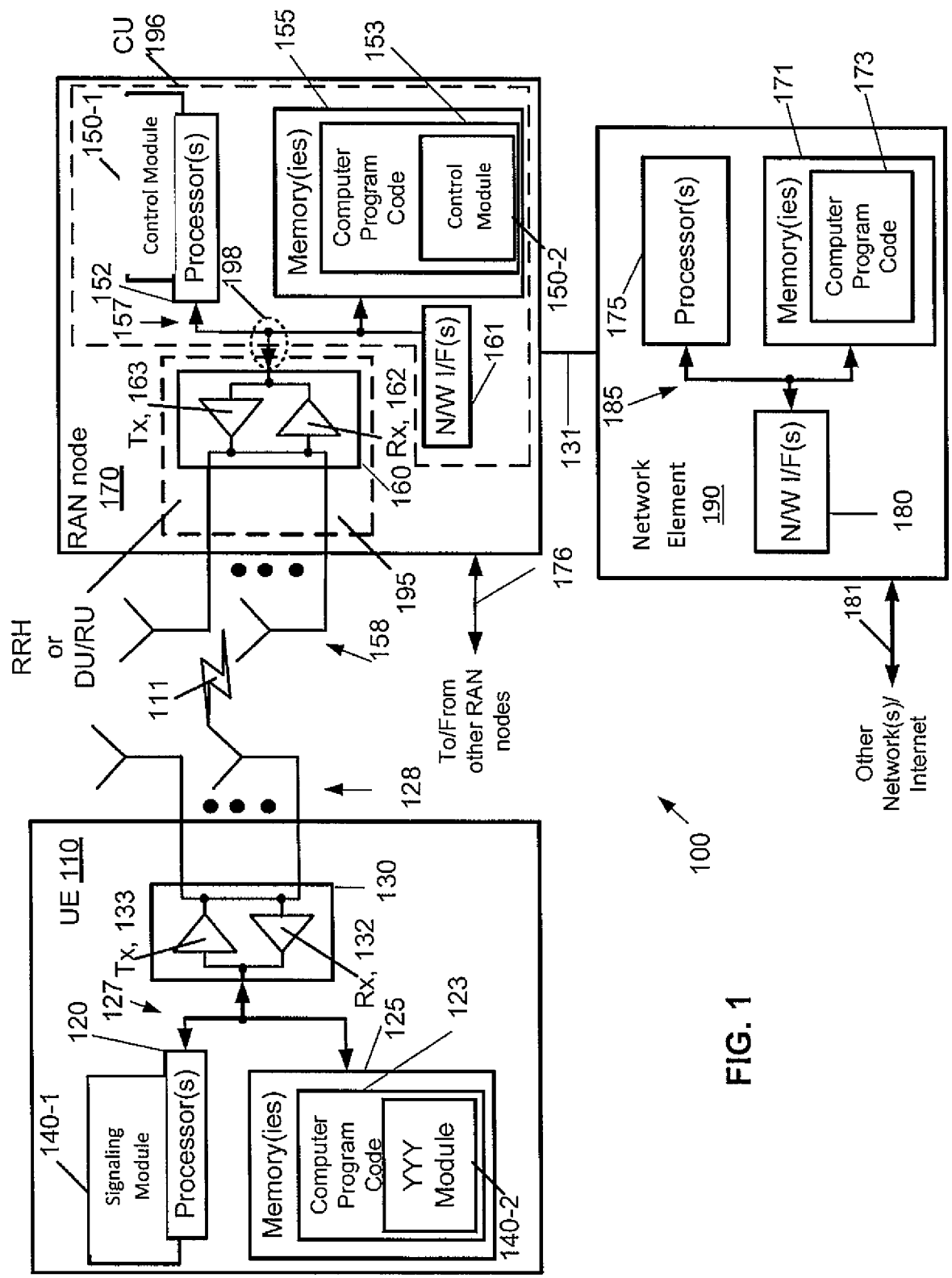
FIG. 1 is a block diagram of one possible and non-limiting example system in which the example embodiments may be practiced.

Turning to FIG. 1, this figure shows a block diagram of one possible and non-limiting exemplary system in which the exemplary embodiments may be practiced. A user equipment (UE) 110, radio access network (RAN) node 170, and network element(s) 190 are illustrated. In FIG. 1, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a signaling module 140, comprising one of or both parts 140-1 and/or 140-2, which may be implemented in a number of ways. The signaling module 140 may be implemented in hardware as signaling module 140-1, such as being implemented as part of the one or more processors 120. The signaling module 140-1 may be implemented also as an integrated circuit or through other hardware such as a programmable gate array. In another example, the signaling module 140 may be implemented as signaling module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

The wireless network 100 may include a network element (or elements) 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to the network element 190. The link 131 may be implemented as, e.g., an NG interface for 5G, or an Si interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium or other device that may be any media or means that can contain or store the instructions for use by or in connection with an instruction execution system, apparatus, or device, such as a computer.

Having thus introduced one suitable but non-limiting technical context for the practice of the exemplary embodiments of this invention, the exemplary embodiments will now be described with greater specificity.

Figure 2:
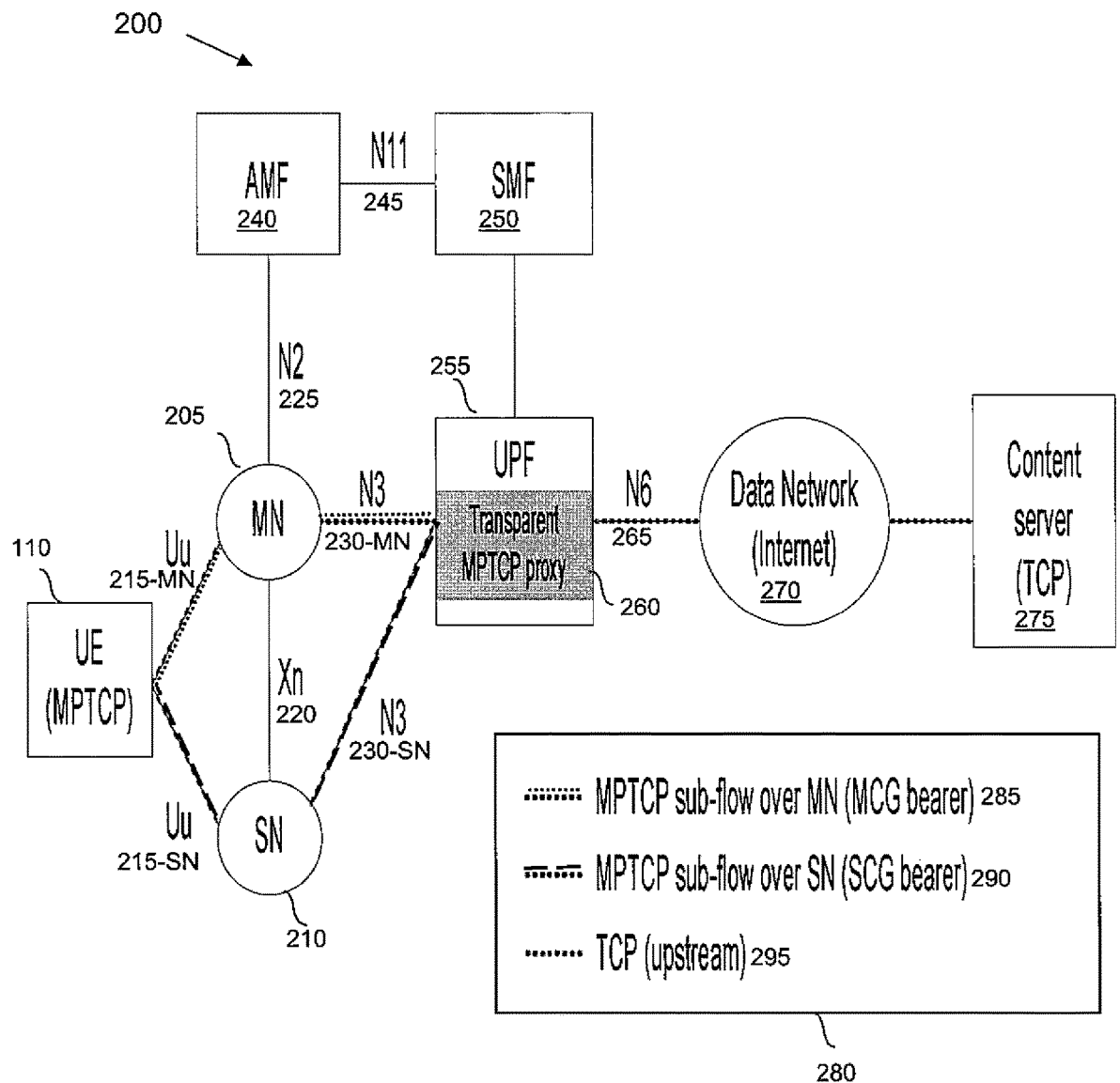
FIG. 2 is a block diagram of one possible and non-limiting example embodiment of a MPTCP capable 5G MR-DC architecture.

FIG. 2 is a block diagram of one possible and non-limiting example of a MPTCP capable (for example, 5G) MR-DC architecture 200 in which the example embodiments may be practiced as described herein.

The example embodiments are directed to systems such as the MR-DC with 5GC, which includes two cases depending on the Master Node (MN) and Secondary Node (SN) types. NGEN-DC: ng-eNB as MN 205 and gNB 170 as SN 210. NE-DC: gNB 170 as both MN 205 and SN 210. ng-eNB is a node providing E-UTRA user plane and control plane protocol terminations towards the UE 110, and connected via the NG interface to the 5GC. gNB 170 is a node providing NR user plane and control plane protocol terminations towards the UE 110, and connected via the NG interface to the 5GC. The U-plane provides connectivity for MR-DC with 5GC. For MR-DC with 5GC (NGEN-DC, NE-DC), Xn-U interface is the user plane interface between MN 205 and SN 210, and NG-U is the user plane interface between the MN 205, the SN 210 or both and the UPF 255.

An example embodiment of a MPTCP capable 5G MR-DC architecture 200 is shown in FIG. 2. The MPTCP capable 5G MR-DC architecture 200 may include a UE 110 (MPTCP), a MN 205, a SN 210, an AMF 240, a SMF 250, a UPF 2555 that includes a transparent MPTCP proxy 260, a data network 270 (for example, the Internet), and a content server (TCP) 275. The UPF 260 may provide a logical proxy capability for the UE 110. In some example embodiments, a proxy functionality may be integrated inside the UPF 255 itself. In alternative embodiments, the UPF 255 may be interfaced with a standalone proxy 260. Transparent in this instance indicates that the terminal device UE 110 is not explicitly aware of the existence of the proxy 260 (for example, the UE 110 does not have to know the address of the proxy 260, etc.).

UE 110 interfaces with MN 205 (via Uu (radio interface) 215-MN), and with SN 210 (via Uu 215-SN). MN also interfaces with SN 210 (via Xn 220), AMF 240 (via N2 225), and transparent MPTCP proxy 260 (via N3 230-MN). SN (also) interfaces with transparent MPTCP proxy 260 (via N3 230-SN), AMF 240 interfaces with SMF 250 (via N11 245), transparent MPTCP proxy 260 interfaces with data network 270 (via N6 265). A flow key 280 for different flows is also included. The flow key identifies MTCP sub-flow over MN (MCG bearer) 285, MPTCP sub-flow over SN (SCG bearer) 290 and TCP (upstream) 295.

With regard to the relationship of sub-flows and bearers: in 5G bearers are defined on the radio access interface (between the UE 110 and the gNB 170, which may be MN 205 or SN 210 as per its role in 3GPP multi-connectivity). MPTCP sub-flows are end-to-end data flows between the UE 110 and the UPF 255/Proxy 260. The mapping of such sub-flows to bearers is not a single step, but there is another abstraction layer in between: the QoS flow. Therefore, each MPTCP sub-flow is mapped to one QoS flow (many-to-one mapping, for example, many sub-flows may be mapped to the same QoS flow), and each QoS flow is then mapped to one bearer (again a many-to-one mapping). The mapping of MPTCP sub-flows to QoS flows is defined and executed by the UPF 255. The mapping of QoS flow to bearer is defined and executed by the SDAP entity (a radio protocol layer introduced in 5G above PDCP). As per the example embodiments, in order to ensure that two sub-flows of the same MPTCP connection are mapped to separate bearers, the bearers also need to be mapped to separate QoS flows and those two separate QoS flows have to be routed to the MN 205 and SN 210 respectively. This configuration may be required to be orchestrated among the UPF 255 and MN 205/SN 210 to be harmonized within the 3GPP network, and this is what the procedures of the example embodiments, such as in described herein below with respect to FIG. 5, implement.

The transparent MPTCP proxy 260 may be a part of the UPF 255 (or attached to the UPF 255). On, for example, the 5G-RAN side, the use of MCG/SCG bearers at the MN/SN side respectively ensure that MPTCP sub-flows are routed towards the UE 110→MN 205→UPF 255 and UE 110→SN 210→UPF 255 paths, avoiding the MN 205←→SN 210 interface (for example, avoiding Xn 220).

The example embodiments expose (for example, provide and/or identify) multiple cellular paths (within 3GPP access) towards the MPTCP capable UE 110 so that the MPTCP can leverage the paths for sub-flow establishment and data transfer.

The example embodiments provide an MPTCP capable MR-DR architecture 200 with the following components. 1) Network side transparent MPTCP proxy with multi-homing emulation for multiple addresses at the MPTCP proxy side. 2) Network side detection of MPTCP capability. 3) Integration to QoS architecture by mapping MPTCP sub-flows to QoS flows (5GC, reflective QoS at UE 110) and mapping QoS flows to MCG/SCG bearers at the SDAP.

With regard to the feature of network side transparent MPTCP proxy with multi-homing emulation for multiple addresses at the MPTCP proxy side (may be implemented) to trigger MPTCP sub-flow creation at the UE 110. This feature of the example embodiments may provide multiple benefits with respect to previous systems. A) The transparent property makes the mechanism independent of the UE 110 and the upper layer protocols (such as HTTP or others) and works without any support or awareness from them. Transparent, as used herein, indicates that the terminal device is not explicitly aware of the existence of the proxy (for example, it does not have to know the address of the proxy, etc. Additionally, the example embodiments prevent a requirement (for example, there is no need) for the network to signal the proxy's IP address to the UE 110 (using NAS)

and the UE 110 to propagate this information to the application/OS/kernel. B) As MPTCP sub-flow establishment is triggered by adding multiple IP addresses at the MPTCP proxy side, not at the UE 110 side, the UE 110 does not have to support multiple IPs on the same (cellular) interface or emulate multiple (virtual) interfaces for the cellular access. Additionally, there is no need for C-plane signalling from the network to the UE 110 as the UE 110 continues to have a single cellular IP address.

Further to the feature of network side detection of MPTCP capability, the example embodiments may include auto-trigger of the multi-connectivity operation "Secondary Node addition" at the MN. Since MPTCP capable UEs 110 establish each new connection using MPTCP (and fall back to TCP if they do not receive a supporting response), the MN 205 may decide to trigger the addition of a SN 210 (if there is one available) based on observing MPTCP capability.

Further to the feature of integration to QoS architecture by mapping MPTCP sub-flows to QoS flows (5GC, reflective QoS at UE 110) and mapping QoS flows to MCG/SCG bearers at the SDAP (5G-RAN, reflective QoS at UE 110). This function ensures that the MPTCP sub-flows established over cellular interface are routed through MN 205 and SN 210 using the appropriate MCG and SCG DRBs, according to the two-level flow mapping of the 5G QoS architecture (NAS/5GC: IP flow to QoS flow; AS/SDAP: QoS flow to DRB).

The example embodiments provide the following benefits. 1) Gain control in the network for managing IP flows (even) for UE(s) 110 with support for MPTCP client. One main drawback of current MPTCP approach is that the control is in the UE 110 side only for selection of access for a given IP flow (mapped to MPTCP sub-flows). Control in this context means what entity decides on the establishment of MPTCP sub-flow. In current MPTCP approach, the UE decides based on the different IP interfaces it sees: if there are two different IPs at UE side, and UE supports MPTCP, then for every IP flow, MPTCP (the UE) will establish two sub-flows (one per IP interface). More than two interfaces will trigger more MPTCP sub-flows. The rationale behind this behavior is that different IPs are assumed to provide (at least partly) disjoint paths, and consequently, diversity in end-to-end packet transfer (which leads to higher reliability and/or higher throughput). However, a problem may arise with the current MPTCP approach in the context of mobile networks in that even if multiple paths exist in the mobile network, the UE only sees a single IP interface as those multiple paths are concealed by the network. The example embodiments, in contrast, provide processes to make the UE 110 aware of the existence of multiple paths and to make the UE 110 establish multiple sub-flows even though the number of IP interfaces will remain one. As described in the example embodiments, control goes into the network because if the network did not expose the existence of multiple paths (specifically, multiple addresses of the UPF side MPTCP proxy), the UE 110 would remain unaware of this opportunity and would not establish additional sub-flow. Multiple sub-flows are established for every IP flow, not just one. As many flows as the UE 110 establishes, the example embodiments provide processes to split (for example, each of these) flows are split into sub-flows.

The example embodiments provide the additional benefits of 2) Leverage dual-connectivity (and multi-connectivity feature) specified for 3GPP access (that allows multiple links to be leveraged for transmitting/receiving packets) to transmit/receive UP flows for which UE 110 has initiated (for example, the need for) MPTCP connection. 3) Allows 3GPP access to be leveraged with its full potential and not offload traffic to third party Wi-Fi. 4) Improves reliability by leveraging 3GPP dual connectivity/multi-connectivity features for applications activating MPTCP capability.

Figure 3:
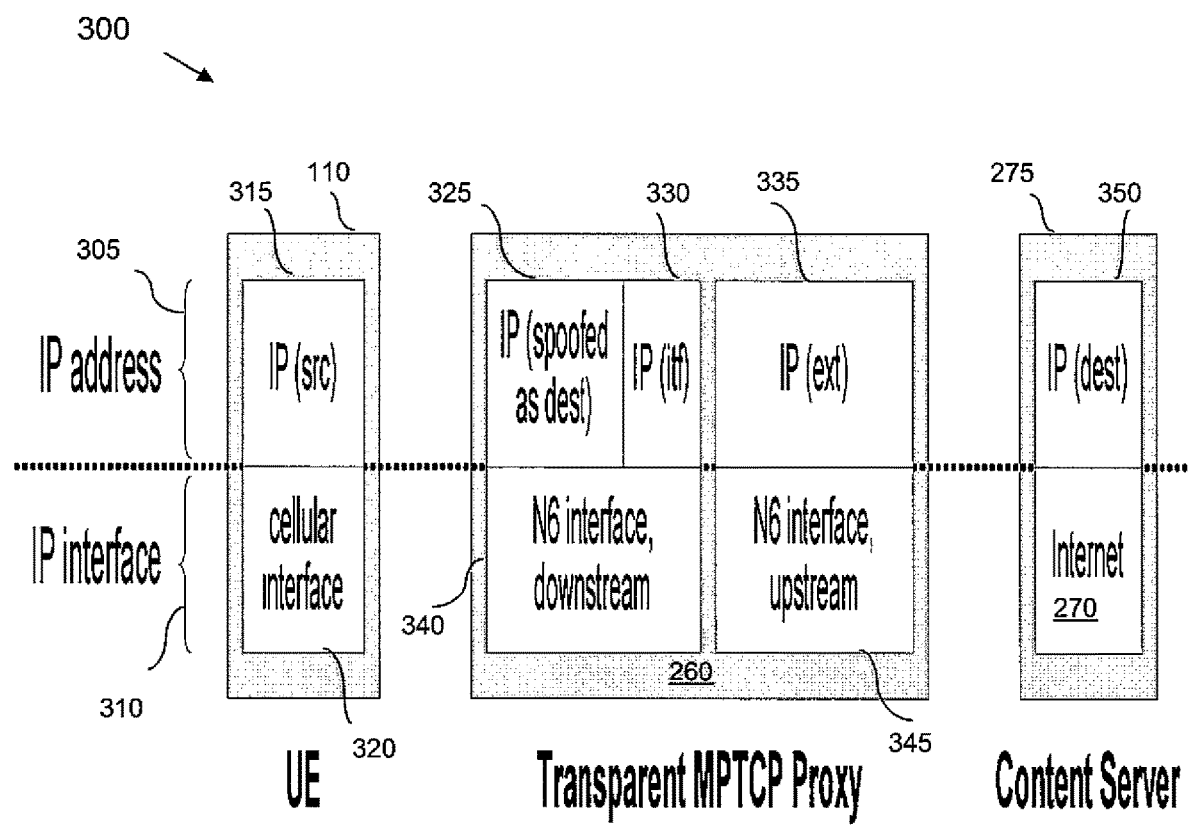
FIG. 3 shows an example embodiment of an IP interface and address configuration.

FIG. 3 shows an example embodiment of an IP interface and address configuration 300.

As shown in FIG. 3, IP interface and address configuration 300 may include an IP address 305, an IP interface 310, UE 110, transparent MPTCP proxy 260, and content server 275.

According to an example embodiment as shown in FIG. 3, the details of the scenario are: The UE 110 has a single cellular interface 320 configured with a single IP address referred to as "IP (src)" 315. The content server 275 has at least one interface available from the Internet 270 with a public IP address referred to as "IP (dest)" 350. The Transparent MPTCP Proxy 260 (Proxy for short) has two interfaces, a downstream interface 340 and an upstream interface 345.

More particularly, the Transparent MPTCP Proxy 260 has two interfaces: 1) A (for example, N6) downstream interface 340 (physical/virtual) connecting to the UPF 255, with a pre-configured IP address referred to as "IP (itf)" 330. Additionally, this interface is used to spoof the source IP address of packets sent by the Proxy 260 to the UE 110 on behalf of the content server 275 (transparent proxy functionality), for example, some packets sent from this interface will carry the content server's 275 IP address, referred to as "IP (spoofed as dest)" 325 (corresponding to IP (dest) 350 of content server 275). 2) An upstream interface connecting towards the Internet, with an IP address referred to as "IP (ext)" 335.

Figure 4:
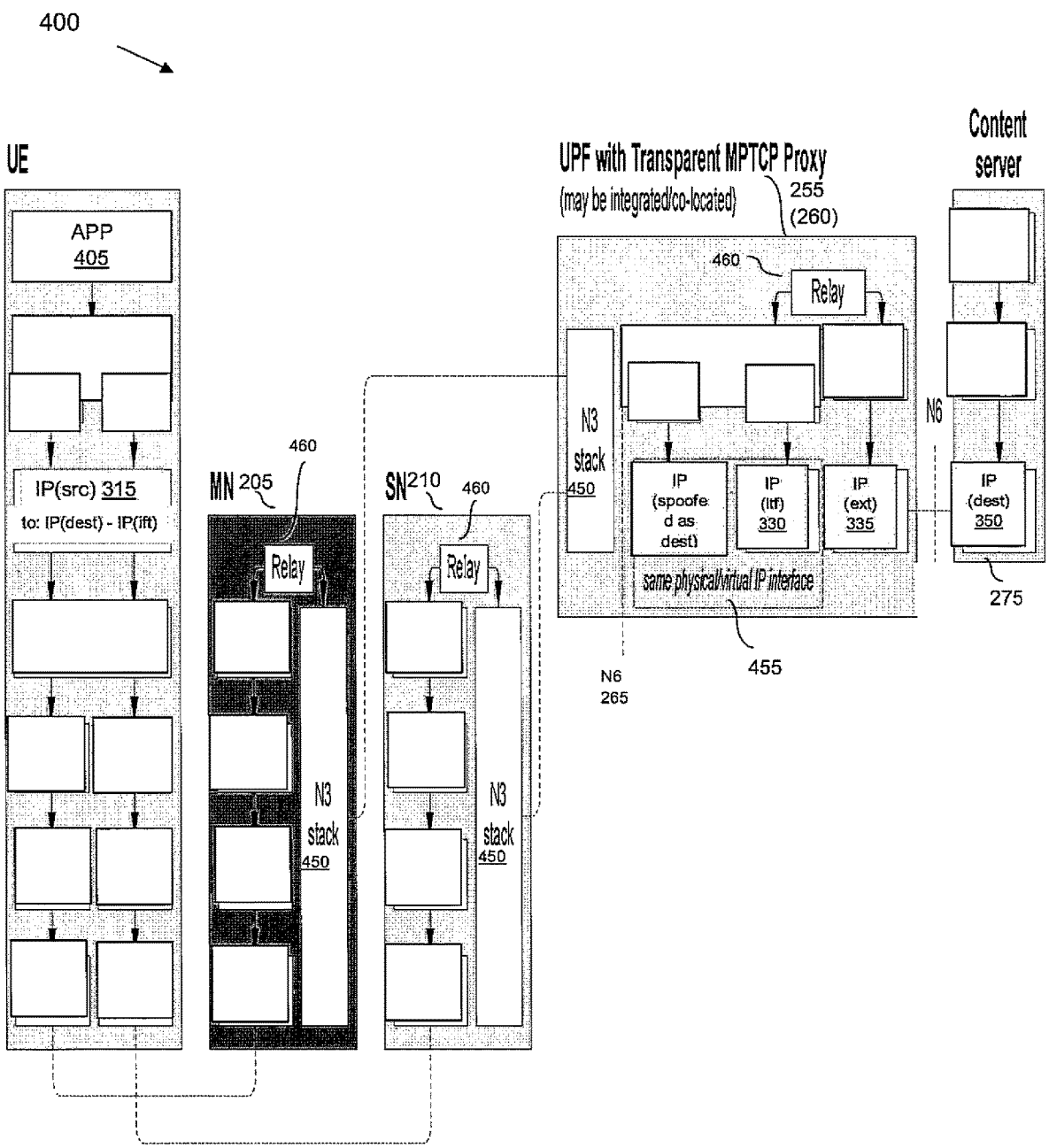
FIG. 4 shows an example embodiment of an U-plane protocol stack.

FIG. 4 shows an example embodiment of U-plane protocol stack 400 as described herein.

As shown in FIG. 4, U-plane protocol stack 400 may include UE 110, MN 205 and SN 210, UPF 255 (with transparent MPTCP proxy 260, not separately shown in FIG. 4), and content server 275.

UE 110 may include an APP 405, an MPTCP 470 with an MNsf 410 (MN sub-flow) and a SNsf 415 (SN sub-flow), an IP (src) 315 to IP (dest) and IP (itf), SDAP 420, NR PDCP 425 (on both MN and SN sides), MN RLC 430, SN RLC 435, MN MAC 440 and SN MAC 445. MN 205 may include SDAP 420, a relay 460 with N3 stack 450, NR PDCP 425, MN RLC 430, and MN MAC 440. SN 210 may include SDAP 420, a relay 460 with N3 stack 450, NR PDCP 425, SN RLC 435, and SN MAC 445.

The U-plane protocol stack may be provided in the example embodiments of an MPTCP capable multi-connectivity architecture. The UE 110 establishes an MPTCP connection with two sub-flows, one over the MN 205 (MNsf 410) and another over the SN 210 (SNsf 415). The Transparent MPTCP Proxy function (Proxy for short) 260 may be integrated or collocated with UPF 255 and splits the connection between the UE 110 and the content server 275 and implements MPTCP towards the UE 110 and MPTCP or TCP towards the content server 275. The example embodiments may use (or attempt to establish) MPTCP towards the content server 275 from the Proxy 260 (even if only a single sub-flow is established) and may ensure that the UE 110 may establish additional sub-flows over non-cellular accesses in the same MPTCP connection later. In instances in which the content server 275 does not support MPTCP, the Proxy 260 may fall back to TCP with the content server 275. The Proxy 260 has a single physical/virtual IP interface towards the UPF function that is logically placed at the N6 interface 265 with an IP address configured, denoted by IP (itf) 330. The UE 110 also has a single IP address referred to as IP (src). The content server's public IP address is referred to as IP (dest).

The Proxy 260 spoofs its IP address towards the UE 110 acting as the content server 275, which is denoted by the address IP (spoofed as dest) 325 at the Proxy 260. The Proxy 260 sends datagrams towards the content server 275 from its external IP interface with the address IP (ext) 335. The IP spoofing towards the UE 110 is performed on the master MPTCP sub-flow 410 (via MN 205), whereas on the secondary sub-flow 415 the Proxy 260 exposes its own address IP (itf) 330. Note that as a generalization of the architecture to additional SN nodes, the Proxy 260 may have additional IP (itf) addresses (which may be virtual addresses configured on the same interface) with additional IP (itf2) 330-2, IP (itf3) 330-3, etc. addresses. Also note that the IP (itf) 330 address exposed by the Proxy 260 on the secondary sub-flow 415 may be a virtual IP address as well.

The content server 275 may include APP 405, MPTCP 470 and IP (dest) 350.

Figure 5:
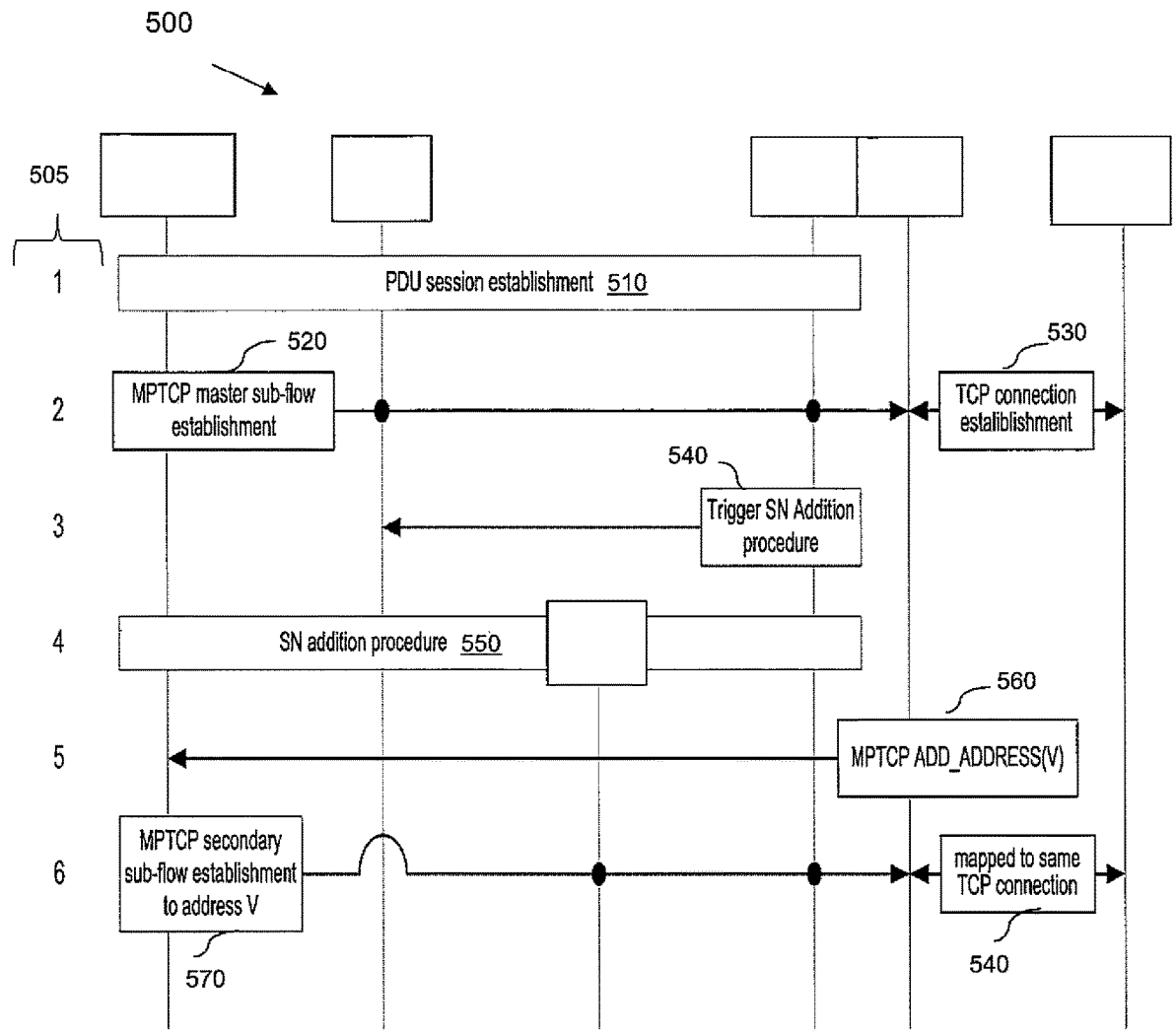
FIG. 5 shows an example embodiment of a Multi-connectivity and MPTCP sub-flow establishment.

FIG. 5 shows an example embodiment of a (signal flow diagram for) Multi-connectivity and MPTCP sub-flow establishment 500.

The establishment of the multi-connectivity and the MPTCP sub-flow creation (to reach the above state) is shown in FIG. 5: This may include UE 110, MN 205, SN 210, UPF 255, Proxy 260 and server 275.

The Steps (505) 1-6 are Detailed as Follows:

Referring now to FIG. 5, at step 1, standard PDU session establishment procedure (see, for example, 3GPP TS 23.501), in which the UE 110 connects to the MN 205 and the UPF 255 that provides the Proxy 260 function as well. The UE 110 may indicate its intention to activate MPTCP traffic for the given PDU Session as part of PDU Session Establishment procedure 510. The selection of a suitable UPF 255 may be implemented using principles from 3GPP TS 23.793.

At step 2, standard MPTCP connection establishment within the U-plane starts with setting up the first (master) sub-flow 520. The establishment (of the MPTCP master sub-flow) 520 is performed via the TCP handshake procedure, where the UE addresses packets to the server's IP (dest). The transparent MPTCP proxy function intercepts the handshake and terminates the MPTCP sub-flow towards the UE 110 (spoofing its own IP address as if it was the server 275, for example, using the server's 275 destination IP as its own). Simultaneously, the MPTCP proxy 260 function establishes an MPTCP or TCP connection 530 to the server 275 (to its original destination address) using its own publicly routable external IP (ext) as the source IP address.

At step 3, the UPF 255/Proxy 260 function detects the MPTCP connection and notifies the SMF 250 (not shown separately in FIG. 5). The SMF 250 may determine MPTCP connection activation also from the UE 110 capability. The SMF 250 triggers the MN 205 to start a standard "SN addition procedure" (trigger SN addition procedure 540) (see, for example, 3GPP TS 37.340) as part of context setup/modification procedure for the given PDU session. This requires a (for example, new) C-plane message from the SMF 250 to the MN 205 (the message is relayed by other C-plane nodes such as the AMF 240 (not shown in FIG. 5)).

At step 4, during the "SN Addition procedure" 550, the MN 205, SN 210 and UPF 255 as well as the involved SMF 250/AMF 240 should configure the MN 205/SN 210 bearers and the U-plane routing so that the MN 205 uses an MCG bearer, the SN 210 uses an SCG bearer and both are routed to the UPF 255/Proxy 260 at the N3 interface 230.

Part of the "SN Addition procedure" 550 is the "PDU session modification procedure" (see, for example, 3GPP TS 23.501), which should update the QoS configuration of the PDU session to handle the mapping of MPTCP sub-flows (both the existing master sub-flow and the to-be-established secondary sub-flow) as follows. The "PDU session modification procedure" may create (for example, is expected to, should create) separate QoS flows for the two MPTCP sub-flows. The sub-flows are mapped to the QoS flows based on the QFI allocated by the 5GC and marked by the UPF on N3 230. The UPF 255 may differentiate the two sub-flows based on markings provided by the Proxy 260 function (as the Proxy 260 is aware of the sub-flow separation), in which case an agreement is required on the marking implementation (in case the UPF 255/Proxy 260 are integrated, the sub-flow awareness is assumed internally). The mapping of the QoS flows to the appropriate DRBs is handled by the SDAP 420 layer, which should be aware that the QFIs indicate MPTCP master and secondary sub-flows that need to be mapped to MCG and SCG bearers respectively. The SDAP's 420 awareness may be implemented via N2 signalling or a special 5G QoS parameter may be implemented (for example, created) that indicates MPTCP sub-flow presence (for example, an integer enumerating the sub-flow within the connection, with a default value indicating no sub-flow presence).

The MPTCP sub-flow→QoS flow→DRB mapping ensures that the MPTCP sub-flows reach the right (for example, a particular target) RAN node. In summary, the mapping should ensure the following outcome. 1) MPTCP (master) sub-flow maps to QoS flow 1; QoS flow 1 is mapped to DRB (MCG bearer) via MN 205. 2) MPTCP (secondary) sub-flow maps to QoS flow 2; QoS flow 2 is mapped to DRB (SCG bearer) via SN 210.

In order to ensure that the UE 110 maps the packets on the UL according to the above packet 4 QoS flow and QoS flow→DRB mapping, SMF 250 can activate Reflective QoS for the PDU Session which will require the UE110 to map the sub-flows accordingly to the QoS flows ½. Also, the RAN may activate Reflective QoS to ensure that the QoS flow is appropriately mapped to the DRB on the UL.

At step 5, at this point the UE 110 still has a single MPTCP sub-flow established and may not be aware (at MPTCP layer) of the presence of the multi-connectivity. To notify the UE's 110 MPTCP layer, the UPF 255/Proxy 260 sends an MPTCP segment with an ADD_ADDRESS option 560 to advertise its IP (itt) address on the proxy side. This approach pulls the MPTCP sub-flow management to the network side, for example, no additional sub-flow is triggered by the UE 110 itself over cellular.

Note that the UE 110 may receive instructions to or be required to establish additional MPTCP sub-flows over non-related accesses (such as a third-party Wi-Fi). In that instance, the content server 275 may be required to support MPTCP (or the UE 110 may be required to use a public MPTCP proxy) as the upstream of the UPF's 255 Proxy 260 and the sub-flows over the third-party accesses have to be joined. This is not a limitation imposed by the example embodiments as even if the cellular link would seem atomic to the UE 110 (as of today), a minimum (or initial) requirement for using MPTCP is an MPTCP termination at the server 275 (otherwise the UE 110 may use either cellular only or non-cellular only).

At step 6, assuming full-mesh MPTCP path manager at the UE 110, the UE 110 establishes a secondary MPTCP sub-flow 570 to the advertised IP (itf) address as a response to receiving the ADD_ADDRESS option. The IP (itf)

address is handled by the Proxy 260 transparently, multiplexing the secondary sub-flow into the same MPTCP socket and merging the traffic to the same (MP) TCP connection 540 towards the server. The MPTCP protocol termination at the Proxy 260 handles re-ordering and multiplexing via the standard MPTCP capability. The UE 110 uses reflective QoS 665 (shown with respect to FIG. 6, described herein below) (see, for example, 3GPP TS 23.501) to handle the mapping of IP flows→QoS flows, and QoS flows→bearers, as dictated by the network.

In some example embodiments, the proxy 260 may be integrated into the UPF 255 software as a feature. Note that even if the proxy 260 and the UPF 255 are provided as a single software entity, logically step 6 is accomplished by the proxy 260 part and not the UPF 255 part (because UPF 255 as per 3GPP is the entity handling the 3GPP protocols, not the user plane transport protocols such as TCP or MPTCP).

Figure 6:
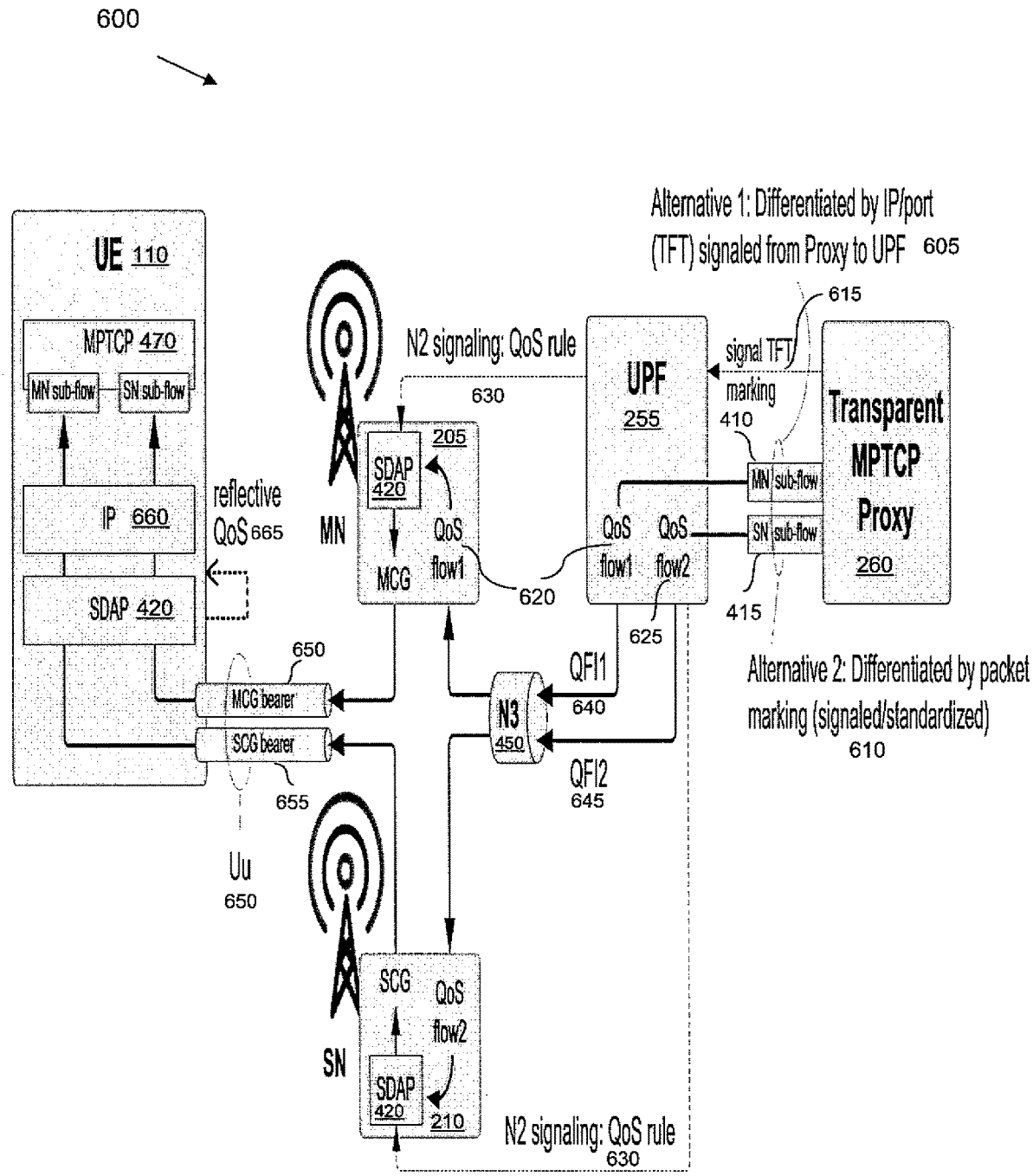
FIG. 6 shows an example embodiment of MPTCP sub-flow mapping in downlink.

FIG. 6 shows an example embodiment of MPTCP sub-flow mapping in downlink 600.

As shown in FIG. 6, MPTCP sub-flow mapping 600 includes transparent MPTCP Proxy 260 with MN sub-flow 410 and SN sub-flow 415 to UPF 255. MPTCP sub-flow mapping 600 also includes MN 205 (which includes SDAP 420), N3 450, SN 210 (which includes SDAP 420), MCG bearer 650, SCG bearer 655 and IP 660. UPF 255 may receive flows, QoS flow 1 620 and QoS flow 2 625 and transmit these sub-flows with QFI1 640 and QFI2 645, respectively via N3 450 to MN 205 and SN 210. The UE 110 uses reflective QoS 665.

The two-level mapping of MPTCP sub-flows 4 QoS flows and QoS flows→DRBs (according to step 4 of FIG. 5 described herein above) is shown in FIG. 6 for the downlink direction. In the uplink, the same mapping is mirrored by the UE 110 through reflective QoS. The MPTCP sub-flow mapping 600 may include two alternatives. In alternative 1 (605), the flows may be differentiated by IP/port (TFT) signalled from Proxy to UPF. Signal TFT marking 615 may be transmitted from transparent MPTCP Proxy 260 to UPF 255. In alternative 2 (610), the flows may be differentiated by packet marking (which may be signalled/standardized).

Leveraging MPTCP's native capability of handling multiple paths seamlessly through data splitting/multiplexing may enable the (for example, 5G) system to avoid duplicating the same functions on the RAN/5GC side. Additionally, MPTCP may be operated in multiple modes (bandwidth aggregation by transferring data on all sub-flows, high reliability mode by duplicating data over all sub-flows, or resiliency mode by maintaining active and hot-swap backup paths) according to the needs of the applications (configurable at the UE 110 side with socket options) without the need for signalling the same intention between the UE and the network. The example embodiments provide a resiliency/reliability scheme may be used in a supplemental manner to dedicated applications (for example, not a substitute for dedicated applications/verticals/use cases that require SLA strength of QoS). The resiliency/reliability scheme may provide benefit for OTT/Internet applications (for example, those such as current systems which provide best effort, no multi-connectivity leverage) where it is not worth (the resources) to provide resiliency/reliability natively from the 5G RAN/5GC.

FIG. 7 is an example flow diagram 700 illustrating a method in accordance with example embodiments which may be performed by an apparatus, for example, UE 110.

At block 710 (corresponding to step 1 of FIG. 5), standard PDU session establishment procedure in which UE 110 connects to the MN 205 and the UPF 255 that provides Proxy 260 function as well. UE 110 may indicate its intention to activate MPTCP traffic for the given PDU Session as part of PDU Session Establishment procedure.

At block 720 (corresponding to step 2 of FIG. 5), UE 110 addresses packets to the server's IP (dest) as part of standard MPTCP connection establishment within the U-plane starts that includes setting up master MPTCP sub-flow performed via TCP handshake procedure. The transparent MPTCP proxy function intercepts the handshake and terminates the MPTCP sub-flow towards the UE 110 (spoofing its own IP address as if it was the server, for example, using the server's destination IP as its own).

At block 730 (corresponding to step 4 of FIG. 5), UE participates in "SN Addition procedure", MN, SN, UPF and involved SMF 250/AMF 240 configure MN/SN bearers and U-plane routing. This may be in response to, corresponding to at step 3 of FIG. 5 herein above, UPF 255/Proxy 260 function detecting the MPTCP connection and notifying SMF 250. SMF 250 may determine MPTCP connection activation also from UE 110 capability. SMF 250 may trigger MN 205 to start a standard "SN addition procedure".

At block 740 (corresponding to step 5 of FIG. 5), UE's 110 MPTCP layer receives notification from UPF 255/Proxy 260 with an MPTCP segment with an ADD ADDRESS option to advertise an IP (itt) of UPF 255/Proxy 260.

At block 750 (step 6 of FIG. 5), UE 110 establishes a secondary MPTCP sub-flow to the advertised IP (itf) address as a response to receiving the ADD_ADDRESS option.

FIG. 8 is an example flow diagram 800 illustrating a method in accordance with example embodiments which may be performed by an apparatus, for example, UPF 255.

At block 810 (step 1 of FIG. 5), UPF 255 (that provides Proxy 260 function) connects to MN 205 and UE 110 in a standard PDU session establishment procedure.

At block 820 (corresponding to step 2 of FIG. 5), MPTCP proxy 260 function establishes an MPTCP or TCP connection to the content server 275 (to its original destination address) using its own publicly routable external IP (ext) as the source IP address. Simultaneously, in standard MPTCP connection establishment, set up of master MPTCP sub-flow performed via TCP handshake procedure, where the UE 110 addresses packets to the server's IP (dest).

At block 830 (corresponding to step 3 of FIG. 5), UPF 255 may detect the MPTCP connection and notifies SMF 250. SMF 250 can determine MPTCP connection activation also from the UE capability. SMF 250 triggers the MN to start a standard "SN addition procedure" as part of context setup/modification procedure for the given PDU session.

At block 840 (corresponding to step 4 of FIG. 5), during the "SN Addition procedure", MN 205, SN 210 and UPF 255 as well as the involved SMF 250/AMF 240 configure the MN/SN bearers and the U-plane routing so that the MN uses an MCG bearer, SN 210 uses an SCG bearer and both are routed to UPF 255/Proxy 260 at the N3 interface.

At block 850 (corresponding to step 6 of FIG. 5), the IP (itf) address may be handled by the Proxy 260 transparently, multiplexing the secondary sub-flow into the same MPTCP socket and merging the traffic to the same (MP)TCP connection towards the server 275. The MPTCP protocol termination at the Proxy 260 handles re-ordering and multiplexing via the standard MPTCP capability. UPF 255 as per 3GPP is the entity handling the 3GPP protocols, not the user plane transport protocols such as TCP or MPTCP.

This may be in response to (corresponding to step 5 of FIG. 5) UE 110 establishing a secondary MPTCP sub-flow to the advertised IP (itf) address as a response to receiving the ADD_ADDRESS option, and Proxy 260 handling IP (itf) address transparently, multiplexing the secondary sub-flow into the same MPTCP socket and merging the traffic to the same MPTCP connection towards the server 275. According to example embodiments, step 5 may be handled by the proxy 260 and not the UPF 255. The "UPF+proxy" entity may be implemented as any of: a loosely coupled pair, or a tightly coupled one. Instances of loose coupling may include, for example, the UPF 22 and proxy 260 running in different virtual machines in the cloud. In other instances example implementations may integrate the proxy 260 into the UPF 255 (for example, software) as a feature.

Without in any way limiting the scope, interpretation, or application of the claims appearing below, a technical effect of one or more of the example embodiments disclosed herein is to leverage MPTCP's native capability of handling multiple paths seamlessly through data splitting/multiplexing that enables a (for example, 5G) system to avoid duplicating the same functions on the RAN/5GC side. Another technical effect is that MPTCP may be operated in multiple modes (bandwidth aggregation by transferring data on all sub-flows, high reliability mode by duplicating data over all sub-flows, or resiliency mode by maintaining active and hot-swap backup paths) according to the needs of the applications (configurable at the UE side with socket options) without the need for signalling the same intention between the UE and the network.

An example embodiment may provide a method comprising connecting, by a terminal device, in a protocol data unit session establishment procedure, to at least one master node and at least one network node that provides a transparent proxy for at least one connection of the terminal device, and establishing a master multipath transmission control protocol sub-flow. The method includes receiving, at a multipath transmission control layer, a notification that includes at least one multipath transmission control segment with an add address option that advertises an internet protocol interface address of at least one of the proxy and the at least one network node, and establishing a secondary multipath transmission control protocol sub-flow to the internet protocol interface address in response to receiving the notification.

In accordance with the example embodiments as described in the paragraphs above, receiving, during a secondary node addition procedure, a requirement to map at least one sub flow according to at least one quality of service flow.

In accordance with the example embodiments as described in the paragraphs above, establishing the master multipath transmission control protocol sub-flow via a transmission control protocol handshake procedure during a multipath transmission control protocol connection establishment procedure, wherein the terminal device addresses at least one packet to a server internet protocol destination address associated with a server.

In accordance with the example embodiments as described in the paragraphs above, wherein terminal device has a single cellular internet protocol address.

In accordance with the example embodiments as described in the paragraphs above, mapping multipath transmission control protocol sub-flows to quality of service flows; and mapping quality of service flows to at least one of at least one master cell group bearer and at least one secondary cell group bearer.

In accordance with the example embodiments as described in the paragraphs above, wherein the at least one network node is at least one user plane function and the proxy is part of the at least one user plane function.

In accordance with the example embodiments as described in the paragraphs above, establishing at least one additional sub-flow over at least one non-cellular access in a same multipath transmission control protocol connection.

An example embodiment may provide a method comprising connecting, by at least one network node that provides a proxy for at least one connection of a terminal device, to the terminal device, and at least one master node in a protocol data unit session establishment procedure; intercepting a transmission control protocol handshake procedure from the terminal device and terminating at least one multipath transmission control protocol sub-flow towards the terminal device; sending at least one notification to trigger a secondary node addition procedure for the terminal device; configuring, during the secondary node addition procedure, at least one main node bearer and at least one secondary node bearer and U-plane routing so that the at least one master node and the secondary node are routed to at least one of the proxy and the at least one network node; sending, to a multipath transmission control layer of the terminal device, notification that includes at least one multipath transmission control segment with an add address option that advertises an internet protocol interface address of at least one of the proxy and the at least one user plane function; and performing, in response to sending the notification, multipath transmission control protocol connection termination for the terminal device.

In accordance with the example embodiments as described in the paragraphs above, detecting at least one multipath transmission control protocol connection and providing a notification to at least one session management function, wherein the at least one session management function, wherein the notification is configured to be used by the at least one session management function to start a secondary node addition procedure.

In accordance with the example embodiments as described in the paragraphs above, wherein the proxy comprises a transparent multipath transmission control protocol proxy with multi-homing emulation for multiple addresses a multipath transmission control protocol proxy side to trigger multipath transmission control protocol sub-flow creation at the terminal device.

In accordance with the example embodiments as described in the paragraphs above, wherein a transparent property makes a mechanism independent of the terminal device and at least one upper layer protocol.

In accordance with the example embodiments as described in the paragraphs above, wherein terminal device has a single cellular internet protocol address.

In accordance with the example embodiments as described in the paragraphs above, performing multipath transmission control protocol termination that includes re-ordering and multiplexing.

In accordance with the example embodiments as described in the paragraphs above, wherein the terminal device addresses at least one packet to a server internet protocol destination address associated with a server.

An example embodiment may be provided in an apparatus comprising means for connecting, by a terminal device, in a protocol data unit session establishment procedure, to at least one master node and at least one network node that provides a transparent proxy for at least one connection of the terminal device; means for establishing a master multipath transmission control protocol sub-flow; means for receiving, at a multipath transmission control layer, a notification that includes at least one multipath transmission control segment with an add address option that advertises an internet protocol interface address of at least one of the proxy and the at least one network node; and means for establishing a secondary multipath transmission control protocol sub-flow to the internet protocol interface address in response to receiving the notification.

In accordance with the example embodiments as described in the paragraphs above, means for receiving, during a secondary node addition procedure, a requirement to map at least one sub flow according to at least one quality of service flow.

In accordance with the example embodiments as described in the paragraphs above, wherein the means for establishing the master multipath transmission control protocol sub-flow further comprises: means for establishing the master multipath transmission control protocol sub-flow via a transmission control protocol handshake procedure during a multipath transmission control protocol connection establishment procedure, wherein the terminal device addresses at least one packet to a server internet protocol destination address associated with a server.

In accordance with the example embodiments as described in the paragraphs above, wherein terminal device has a single cellular internet protocol address.

In accordance with the example embodiments as described in the paragraphs above, further comprising: means for mapping multipath transmission control protocol sub-flows to quality of service flows; and means for mapping quality of service flows to at least one of at least one master cell group bearer and at least one secondary cell group bearer.

In accordance with the example embodiments as described in the paragraphs above, wherein the at least one network node is at least one user plane function and the proxy is part of the at least one user plane function.

In accordance with the example embodiments as described in the paragraphs above, means for establishing at least one additional sub-flow over at least one non-cellular access in a same multipath transmission control protocol connection.

An example embodiment may provide an apparatus, comprising means for connecting, by at least one network node that provides a proxy for at least one connection of a terminal device, to the terminal device, and at least one master node in a protocol data unit session establishment procedure; means for intercepting a transmission control protocol handshake procedure from the terminal device and terminating at least one multipath transmission control protocol sub-flow towards the terminal device; means for sending at least one notification to trigger a secondary node addition procedure for the terminal device; means for configuring, during the secondary node addition procedure, at least one main node bearer and at least one secondary node bearer and U-plane routing so that the at least one master node and the secondary node are routed to at least one of the proxy and the at least one network node; means for sending, to a multipath transmission control layer of the terminal device, notification that includes at least one multipath transmission control segment with an add address option that advertises an internet protocol interface address of at least one of the proxy and the at least one user plane function; and means for performing, in response to sending the notification, multipath transmission control protocol connection termination for the terminal device.

In accordance with the example embodiments as described in the paragraphs above, means for detecting at least one multipath transmission control protocol connection and providing a notification to at least one session management function, wherein the at least one session management function, wherein the notification is configured to be used by the at least one session management function to start a secondary node addition procedure.

In accordance with the example embodiments as described in the paragraphs above, wherein the proxy comprises a transparent multipath transmission control protocol proxy with multi-homing emulation for multiple addresses a multipath transmission control protocol proxy side to trigger multipath transmission control protocol sub-flow creation at the terminal device.

In accordance with the example embodiments as described in the paragraphs above, wherein a transparent property makes a mechanism independent of the terminal device and at least one upper layer protocol.

In accordance with the example embodiments as described in the paragraphs above, wherein the terminal device has a single cellular internet protocol address.

In accordance with the example embodiments as described in the paragraphs above, means for performing multipath transmission control protocol termination that includes re-ordering and multiplexing.

In accordance with the example embodiments as described in the paragraphs above, wherein the terminal device addresses at least one packet to a server internet protocol destination address associated with a server.

An example embodiment may be provided in an apparatus comprising at least one processor; and at least one non-transitory memory including computer program code, the at least one memory and the computer program code may be configured to, with the at least one processor, cause the apparatus to: connect, by a terminal device, in a protocol data unit session establishment procedure, to at least one master node and at least one network node that provides a transparent proxy for at least one connection of the terminal device; establish a master multipath transmission control protocol sub-flow; receive, at a multipath transmission control layer, a notification that includes at least one multipath transmission control segment with an add address option that advertises an internet protocol interface address of at least one of the proxy and the at least one network node; and establish a secondary multipath transmission control protocol sub-flow to the internet protocol interface address in response to receiving the notification.

In accordance with the example embodiments as described in the paragraphs above, receive, during a secondary node addition procedure, a requirement to map at least one sub flow according to at least one quality of service flow.

In accordance with the example embodiments as described in the paragraphs above, establish the master multipath transmission control protocol sub-flow via a transmission control protocol handshake procedure during a multipath transmission control protocol connection establishment procedure, wherein the terminal device addresses at least one packet to a server internet protocol destination address associated with a server.

In accordance with the example embodiments as described in the paragraphs above, wherein terminal device has a single cellular internet protocol address.

In accordance with the example embodiments as described in the paragraphs above, mapping multipath transmission control protocol sub-flows to quality of service flows; and mapping quality of service flows to at least one of at least one master cell group bearer and at least one secondary cell group bearer.

In accordance with the example embodiments as described in the paragraphs above, wherein the at least one network node is at least one user plane function and the proxy is part of the at least one user plane function.

In accordance with the example embodiments as described in the paragraphs above, establishing at least one additional sub-flow over at least one non-cellular access in a same multipath transmission control protocol connection.

An example embodiment may be provided in an apparatus comprising at least one processor; and at least one non-transitory memory including computer program code, the at least one memory and the computer program code may be configured to, with the at least one processor, cause the apparatus to: connect, by at least one network node that provides a proxy for at least one connection of a terminal device, to the terminal device, and at least one master node in a protocol data unit session establishment procedure; intercepting a transmission control protocol handshake procedure from the terminal device and terminating at least one multipath transmission control protocol sub-flow towards the terminal device; sending at least one notification to trigger a secondary node addition procedure for the terminal device; configuring, during the secondary node addition procedure, at least one main node bearer and at least one secondary node bearer and U-p lane routing so that the at least one master node and the secondary node are routed to at least one of the proxy and the at least one network node; sending, to a multipath transmission control layer of the terminal device, notification that includes at least one multipath transmission control segment with an add address option that advertises an internet protocol interface address of at least one of the proxy and the at least one user plane function; and performing, in response to sending the notification, multipath transmission control protocol connection termination for the terminal device.

In accordance with the example embodiments as described in the paragraphs above, detect at least one multipath transmission control protocol connection and providing a notification to at least one session management function, wherein the at least one session management function, wherein the notification is configured to be used by the at least one session management function to start a secondary node addition procedure.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments, these descriptions should not be viewed in a limiting sense. Rather, there are several variations and modifications which may be made without departing from the scope of the present invention.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments, these descriptions should not be viewed in a limiting sense. Rather, there are several variations and modifications which may be made without departing from the scope of the present invention as defined in the appended claims.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of example and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
    connecting, by a network node proxy comprising a user plane function and a multipath transmission control protocol proxy to a terminal device, and a master node in a protocol data unit session establishment procedure;
    intercepting, by the multipath transmission control protocol proxy, a transmission control protocol handshake from the terminal device and terminating a master multipath transmission control protocol sub-flow towards the terminal device using an internet protocol address of a content server as an internet protocol address for the master multipath transmission control protocol sub-flow;
    sending, by the user plane function to a session management function, a notification of detection a multipath transmission control protocol connection from the multipath transmission control protocol proxy to a content server to cause the session management function to trigger the master node to start a secondary node addition procedure;
    configuring, by the user plane function to a session management function, during a secondary sub-flow procedure, at least one main node bearer for the master node and at least one secondary node bearer for a secondary node and configuring, by the user plane function, user plane routing so that both the master node and the secondary node are routed to the user plane function of the network node;
    sending, by the multipath transmission control protocol, to a multipath transmission control layer of the terminal device, at least one multipath transmission control segment with an add address option that advertises an internet protocol interface address of the multipath transmission control protocol proxy; and
    performing, in response to sending the establishment of a secondary multipath transmission control protocol sub-flow to the internet protocol address of the multipath transmission control protocol proxy, multipath transmission control protocol connection termination for the terminal device including re-ordering packets and multiplexing the multipath transmission control protocol secondary sub-flow and the multipath transmission control protocol master multipath transmission control protocol sub-flow, respectively.

2. The method of claim 1, further comprising:
    establishing, by the user plane function, a multipath transmission control protocol connection to the content server.

3. The method according to claim 1, wherein the proxy comprises a transparent multipath transmission control protocol proxy with multi-homing emulation for multiple addresses.

4. The method according to claim 1, further comprising receiving, by the user plane function during the secondary node addition procedure, a quality of service configuration for mapping of the master multipath transmission control protocol sub-flow and the secondary master multipath transmission control protocol sub-flow to quality of service flows.

5. The method according to claim 1, further comprising:
    mapping, by the user plane function, the master multipath transmission control protocol sub-flow to a first quality of service sub-flow and the secondary multipath transmission control protocol sub-flow to a second quality of service flow based on quality of service flow identities.

6. An apparatus comprising:
    at least one processor; and
    at least one non-transitory memory storing instructions that when executed by the at least one processor, cause the apparatus to:
    connect, by a multipath transmission control protocol proxy and a user plane function, to a master node in a protocol data unit session establishment procedure;
    intercept, by the multipath transmission control protocol proxy, a transmission control protocol handshake from the terminal device and terminate a master multipath transmission control protocol sub-flow towards the terminal device using art internet protocol address of a content server as an internet protocol address for the master multipath transmission control protocol sub-flow;
    send, by the user plane function to a session management function, a notification of detection a multipath transmission control protocol connection from the multipath transmission control protocol proxy to a content server to cause the session management function to trigger the master node to start a secondary node addition procedure;
    configure, by the user plane function, during a secondary sub-flow procedure, at least one main node bearer for the master node and at least one secondary node bearer for a secondary node and configure, by the user plane function, user plane routing so that both the master node and the secondary node are routed to the user plane function;
    send, by the multipath transmission control protocol, to a multipath transmission control layer of the terminal device, at least one multipath transmission control segment with an add address option that advertises an internet protocol interface address of the multipath transmission control protocol proxy; and
    perform, in response to sending the establishment of a secondary multipath transmission control protocol sub-flow to the internet protocol address of the multipath transmission control protocol proxy, multipath transmission control protocol connection termination for the terminal device including re-ordering packets and multiplexing the multipath transmission control protocol secondary sub-flow and the multipath transmission control protocol master multipath transmission control protocol sub-flow, respectively.

7. The apparatus of claim 6, wherein the at least one non-transitory memory is storing instructions that when executed by the at least one processor, cause the apparatus to:
   establish, by the user plane function, a multipath transmission control protocol connection to the content server.

8. The apparatus of claim 6, wherein the multipath transmission control proxy comprises a transparent multipath transmission control protocol proxy with multi-homing emulation for multiple addresses.

9. The apparatus of claim 6, wherein the U-plane routing is using a quality of service configuration for mapping of quality of service sub-flows to the at least one multipath transmission, wherein the mapping is performed by a service data adaptation protocol layer.

10. The apparatus of claim 6, wherein the at least one non-transitory memory is storing instructions that when executed by the at least one processor, cause the apparatus to:
   map, by the user plane function, the master multipath transmission control protocol sub-flow and the secondary multipath transmission control protocol sub-flow to a secondary quality of service flow.

\* \* \* \* \*